US008130960B2

(12) United States Patent
Zimmer et al.

(10) Patent No.: US 8,130,960 B2
(45) Date of Patent: Mar. 6, 2012

(54) METHOD AND APPARATUS FOR PROVIDING SEAMLESS FILE SYSTEM ENCRYPTION FROM A PRE-BOOT ENVIRONMENT INTO A FIRMWARE INTERFACE AWARE OPERATING SYSTEM

(75) Inventors: Vincent J. Zimmer, Federal Way, WA (US); Michael A. Rothman, Gig Harbor, WA (US)

(73) Assignee: Intel Corporation, Santa Clara, CA (US)

( * ) Notice: Subject to any disclaimer, the term of this patent is extended or adjusted under 35 U.S.C. 154(b) by 1423 days.

(21) Appl. No.: 11/556,782

(22) Filed: Nov. 6, 2006

(65) Prior Publication Data

US 2007/0061562 A1 Mar. 15, 2007

Related U.S. Application Data

(62) Division of application No. 10/361,211, filed on Feb. 10, 2003, now Pat. No. 7,320,052.

(51) Int. Cl.
*G06F 21/00* (2006.01)
(52) U.S. Cl. ............... 380/277; 713/165; 713/2; 726/26
(58) Field of Classification Search ...... 713/2, 165–167, 713/189–193; 711/112, 114; 714/6; 380/277, 380/286; 726/26–30; 717/120, 124, 127
See application file for complete search history.

(56) References Cited

U.S. PATENT DOCUMENTS

| 5,416,841 | A * | 5/1995 | Merrick .................... 380/29 |
| 5,937,063 | A * | 8/1999 | Davis ...................... 713/187 |
| 6,185,681 | B1 * | 2/2001 | Zizzi ...................... 713/165 |
| 6,434,561 | B1 * | 8/2002 | Durst et al. ................. 1/1 |
| 6,643,735 | B2 | 11/2003 | Rodriguez et al. |
| 7,206,970 | B1 * | 4/2007 | Lauterbach et al. ........... 714/36 |
| 2002/0169951 | A1 * | 11/2002 | Zimmer .................... 713/100 |
| 2002/0169979 | A1 * | 11/2002 | Zimmer .................... 713/200 |
| 2002/0194528 | A1 | 12/2002 | Hart |
| 2003/0014622 | A1 * | 1/2003 | Larvoire .................... 713/2 |
| 2003/0110370 | A1 * | 6/2003 | Fish et al. .................. 713/2 |
| 2003/0120918 | A1 * | 6/2003 | VanDer Kamp ............. 713/164 |

OTHER PUBLICATIONS

Comparison of disk encryption software, Wikipedia, http://en.wikipedia.org/wiki/Comparison_of_disk_encryption_software.*
SafeGuard Easy Description, Sophos, http://www.sophos.com/products/enterprise/encryption/safeguard-easy/.*

* cited by examiner

*Primary Examiner* — Kim Vu
*Assistant Examiner* — John B King
(74) *Attorney, Agent, or Firm* — Marshall, Gerstein & Borun LLP

(57) ABSTRACT

Methods and apparatus for providing seamless functionality in a computer are disclosed. For example, an encrypted file system manager is included to layer an encoded File Allocation Table on top of a disk and to pass to the operating system an Embedded Root Key to provide access to an encrypted Firmware Interface System Partition.

19 Claims, 12 Drawing Sheets

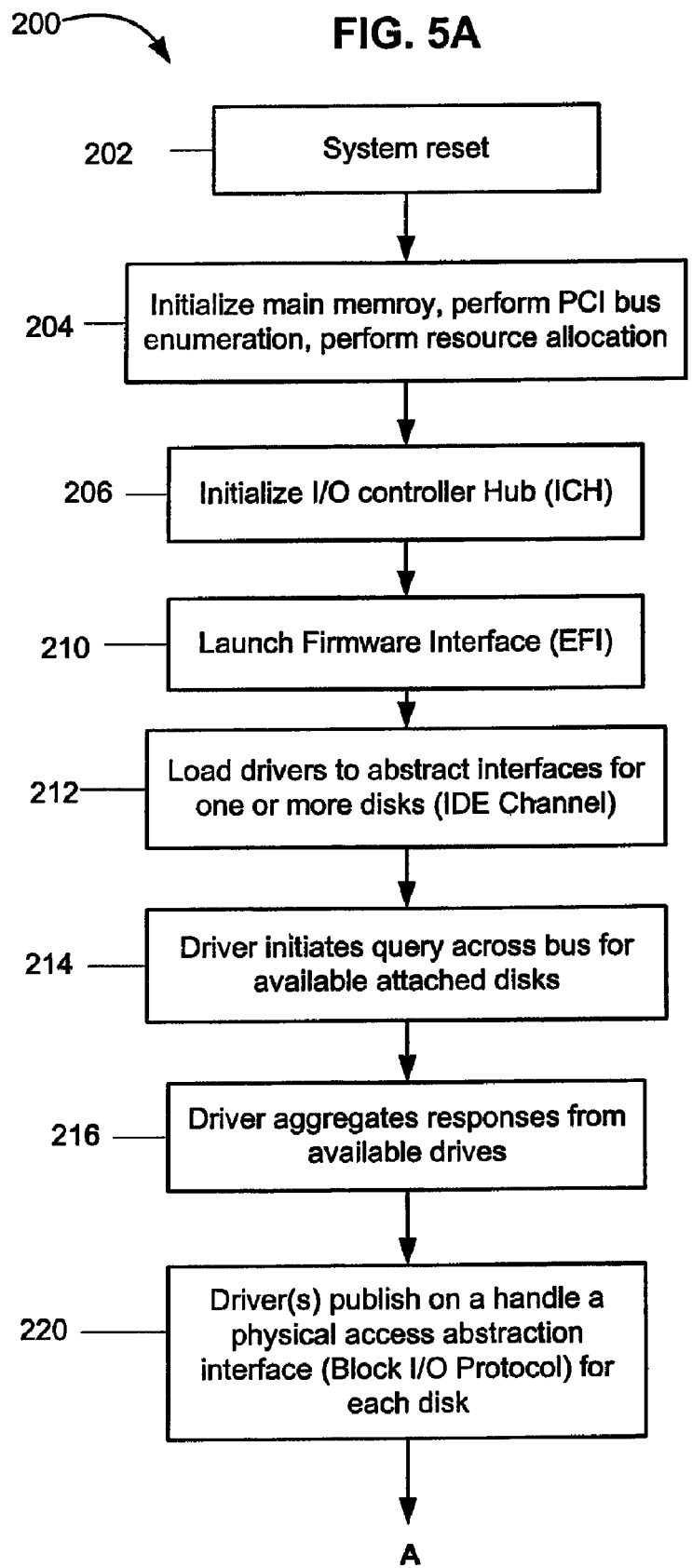

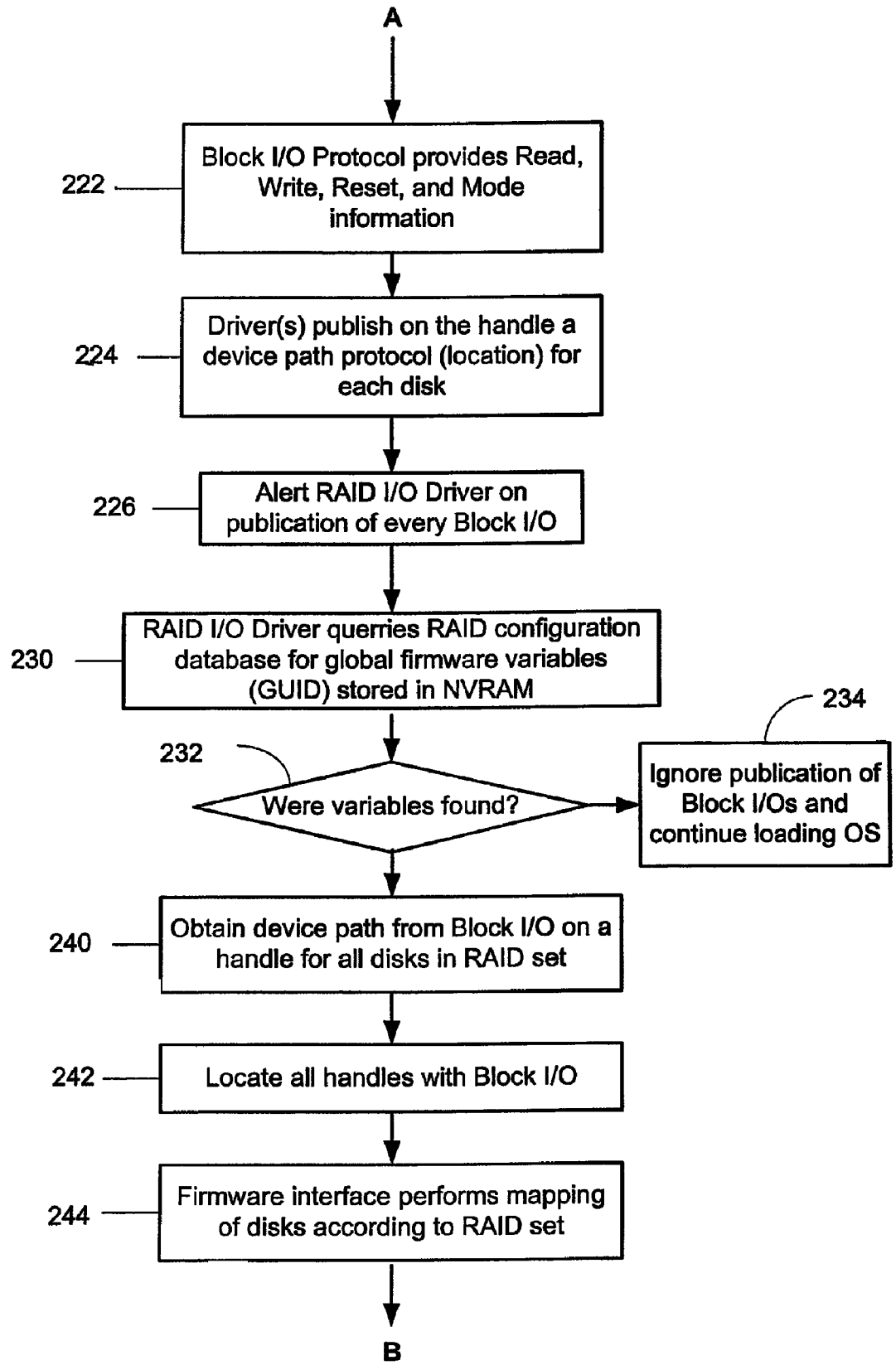

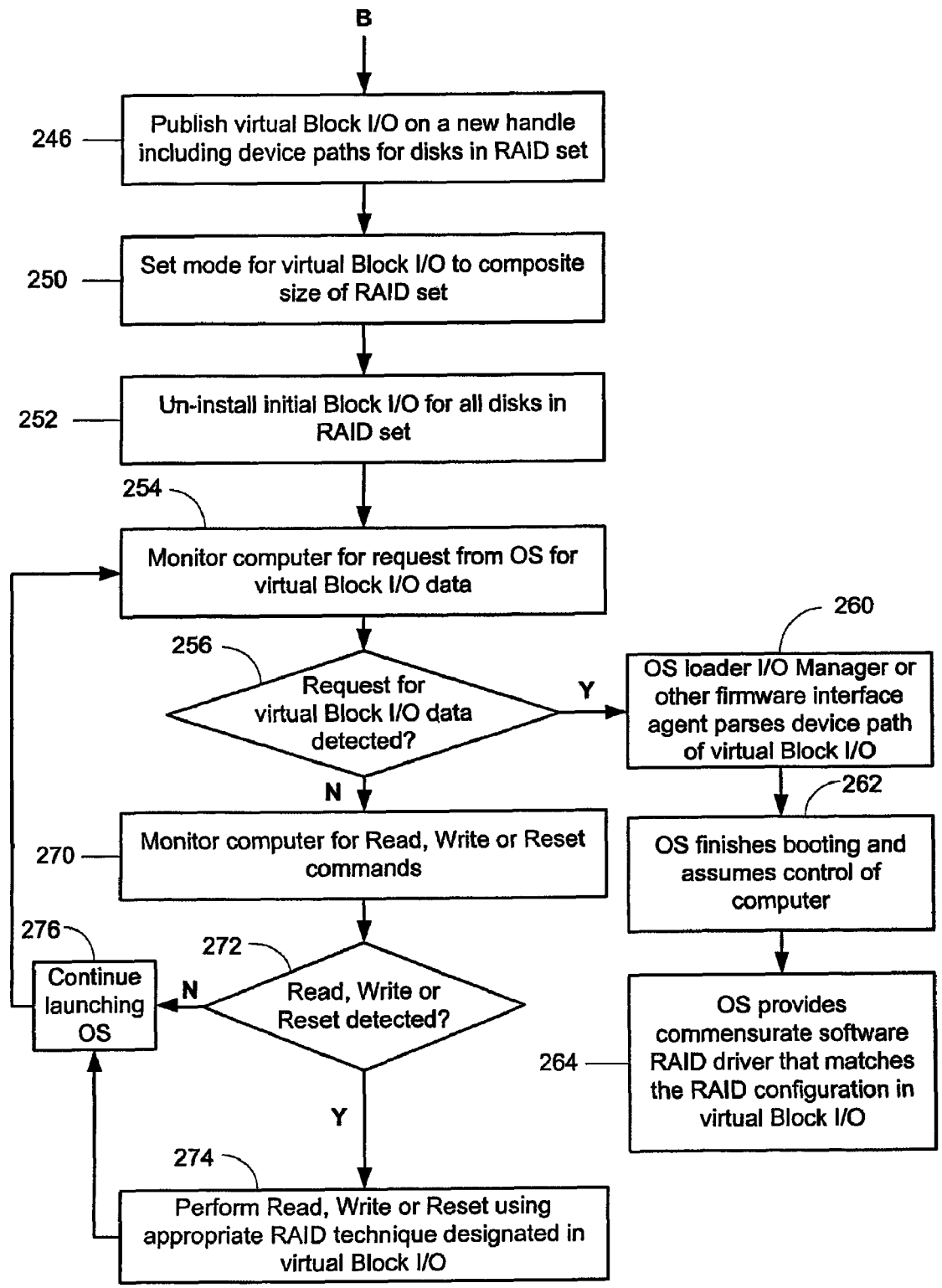

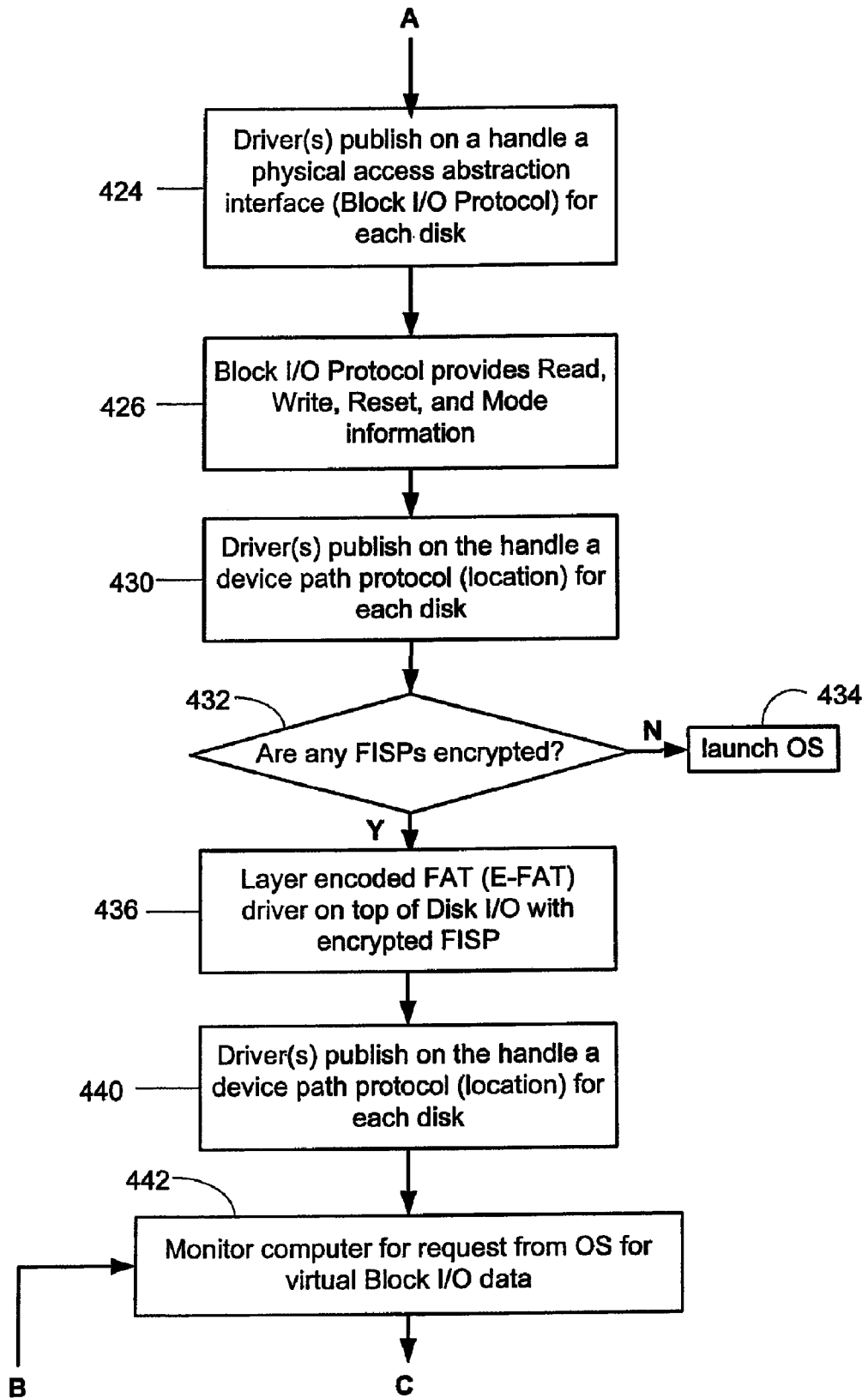

METHOD AND APPARATUS FOR PROVIDING SEAMLESS FILE SYSTEM ENCRYPTION FROM A PRE-BOOT ENVIRONMENT INTO A FIRMWARE INTERFACE AWARE OPERATING SYSTEM

CROSS REFERENCE

This application is a divisional of U.S. application Ser. No. 10/361,211, now U.S. Pat. No. 7,320,052, filed Feb. 10, 2003, the disclosure of which is hereby incorporated herein by reference in its entirety for all purposes.

FIELD OF THE DISCLOSURE

The patent relates generally to seamless management of a computer, and more particularly, to methods and apparatus for providing seamless file system encryption from a firmware interface pre-boot operational environment into a firmware interface aware operating system.

BACKGROUND

The boot environment for computers presents significant challenges to innovation within the hardware and software industries. Each new platform capability or hardware innovation requires firmware developers to craft increasingly complex solutions, and often requires Operating System (OS) developers to make changes to their boot code before customers can benefit from the innovation. This can be a time-consuming process requiring a significant investment of resources. The hardware and software industries have attempted to allow the platform and OS to evolve and innovate independently of one another.

To permit such independent innovation and maintain necessary communication between an OS and platform firmware (any software that is included in read-only memory (ROM)), an interface having an additional layer of firmware code provides for the abstraction of the OS and all higher level software from the firmware. The interface operates in what is referred to as a pre-boot environment as well as providing some additional run-time capabilities. Previous attempts to develop such an interface have required the OS to have specific knowledge of the workings of certain hardware devices. Previous attempts at developing the interface were not effective and did not allow for the dynamic management of those devices in the pre-boot environment and in some run-time environments.

In conventional computers that do not use a firmware interface, the file system is naked to rogue or en-ant code in the pre-boot environment. In particular, the firmware interface system partition in conventional computers is subject to errant modifications and malicious out-of-band updates. Hardening of the firmware interface system partition in both the pre-boot and the runtime environments is thus of particular importance.

BRIEF DESCRIPTION OF THE DRAWINGS

FIGS. 5A-C are parts of a flowchart illustrating some events to provide seamless RAID in a computer.

FIGS. 8A-C are parts of a flowchart illustrating some events to provide seamless file system encryption in a computer.

DESCRIPTION OF VARIOUS EMBODIMENTS

The present patent describes methods and an apparatus to enable a Redundant Array of Independent Disks (RAID) Configuration Manager for a machine (i.e., computer) from a firmware interface pre-boot operational environment into a firmware interface aware operating system. The RAID Configuration Manager provides the fault tolerances and performance advantages for a variety of RAID configurations to be provided seamlessly from the pre-boot environment ("early RAID") to the operating system (OS) runtime ("late RAID"). This will allow for the advantages of RAID to be had on a host processor found on commodity motherboards that do not require additional hardware, such as additional proprietary controllers.

Providing RAID seamlessly from the pre-boot environment to the OS runtime enables some fault tolerance on a Firmware Interface System Partition (FISP) which is a section of a disk (i.e. partition) where an OS loader and other important diagnostics are installed. An example of an acceptable firmware interface is an Extensible Firmware Interface (EFI) which will be discussed in more detail below.

An encrypted file system manager is also disclosed to increase the security in a computer by hardening the FISP in both a firmware interface pre-boot operational environment and continuing seamlessly into a firmware interface aware operating system. The encrypted file system manager disclosed herein uses a platform specific secret by both the firmware interface in the pre-boot environment and the OS during OS runtime to provide encryption and decryption capabilities. This will detect errant modifications (i.e., secret or write failures) and malicious out-of-band updates.

Figure 1:
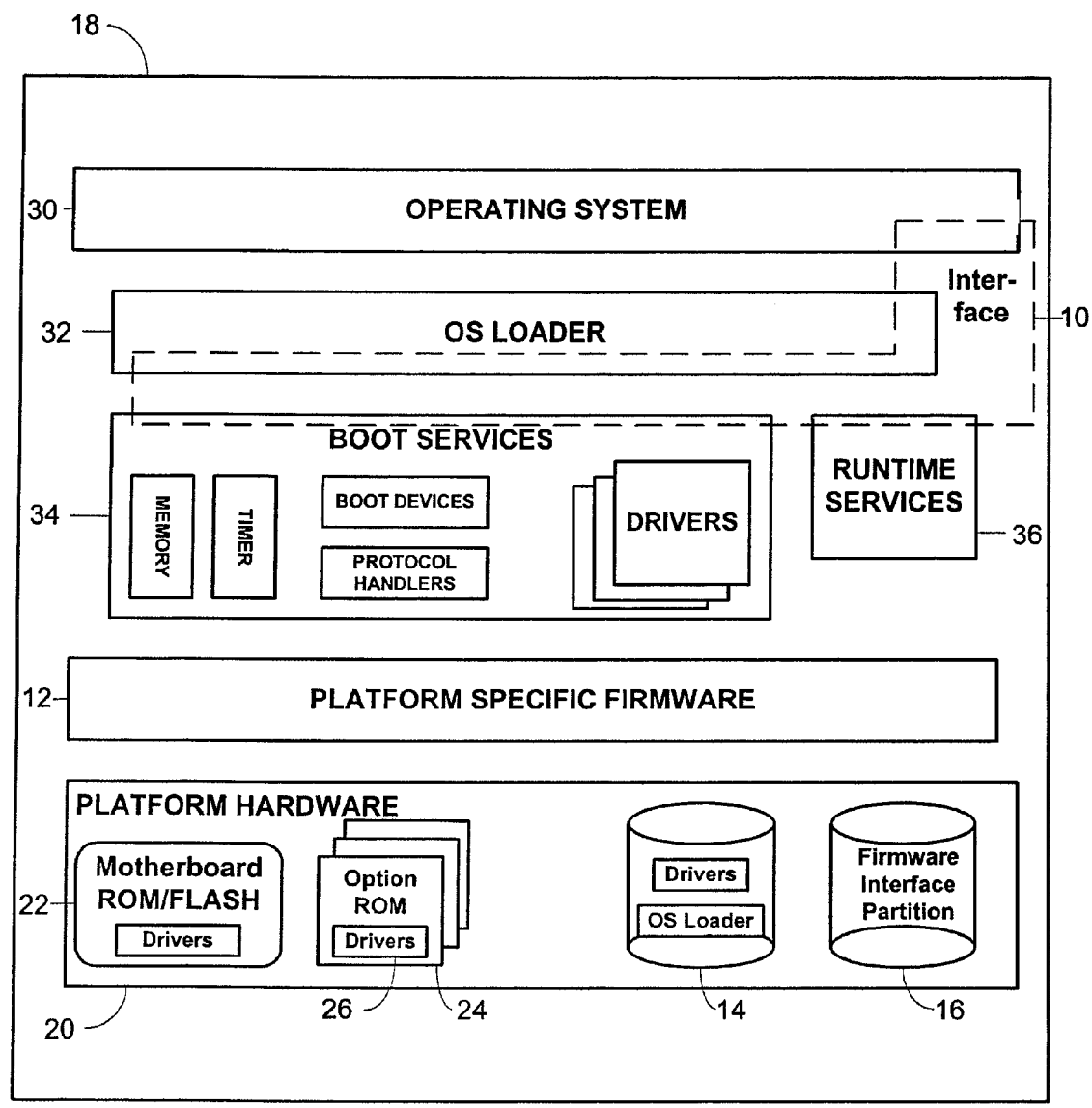
FIG. 1 illustrates some of the principal components of an embodiment of a firmware interface and their relationship to platform hardware and OS software.

FIG. 1 is a block diagram of several components of an embodiment of an interface 10 constructed in accordance with the teachings of the patent. This diagram illustrates the interactions of the various components accessed by the interface 10 to accomplish platform and OS boot. The platform firmware 12 is able to retrieve an OS loader image 14 from a firmware interface system partition (FISP) 16. The hardware and software components illustrated in FIG. 1 are some of the integral components of a computer/machine 18. It should be noted that for the purposes of this Description, the terms "computer" and "machine" are intended to be interchangeable.

The interface system partition 16 is one of several components included in the platform hardware 20. The platform hardware 20 includes several machine-accessible medium including a motherboard flash memory 22, a plurality of option Read Only Memories (ROMs) 24. The platform hardware also includes a plurality of drivers 26 that are modules of code typically inserted into the firmware via protocol interfaces. A protocol is akin to a C++ Class and is a collection of read-only data and a collection of callable interfaces. The interfaces are similar to C++ methods and are named by 16-byte unique identifiers, also known as Globally Unique Ids (GUIDs).

The drivers 26 are the control mechanisms for attached hardware devices and are typically embedded in the corresponding hardware option ROM 24 or flash memory 22. It should also be noted that interface drivers may provide device support during the boot process or they may provide platform services. In contrast, OS drivers are loaded to provide device support once the OS 30 takes control of the platform hardware 20.

A variety of mass storage devices including, for example, disk, compact disk (CD) drives and digital versatile disk (DVD) drives may be supported by the interface 10 to boot the OS 30. The OS 30 may also be remotely booted via a network. Persons of ordinary skill in the art will appreciate that other boot media types may be added to the platform hardware 20.

The interface 10 communicates with an OS loader 32. Once started, the OS loader 32 continues to boot the complete operating system 30. To do so, the OS loader 32 uses the interface boot services 34 and the interface 10 to survey, comprehend and initialize the various platform components and the OS software that manages them. Interface runtime services 36 are also available to the OS loader 32 during the boot phase. It should be noted that the interface 10 supports platform hardware architecture that has 32 and/or 64 bit instruction capabilities, as well as being easily adapted for use on other architectures.

The computer 18 of the instant example includes a few additional hardware components found in conventional computers, such as, for example, personal computers, laptops, notebooks, servers, etc. The computer 18 may optionally include modifications to that conventional construction as explained in detail below. Thus, as shown in FIG. 2, the computer 18 includes a central processing unit 40 which is implemented, for example, by one or more Intel® microprocessors from the Pentium® family, the Itanium™ family, the XScale™ family or any other family of microprocessors.

In the illustrated example, the interface 10 is Intel's Extensible Firmware Interface (hereafter "EFI") which is an open extensible interface that lends itself to the creation of platform drivers. These drivers may be analogous to OS drivers, providing support for new device types during the boot process, or they may be used to implement enhanced platform capabilities such as fault tolerance or security. The EFI 10 helps developers avoid many of the frustrations inherent in trying to squeeze new code into a traditional Basic Input/Output System (hereafter "BIOS") environment. BIOS may be described in most instances as a collection of low-level service routines. As previously discussed, the EFI gives firmware developers an infrastructure to add capability to the platform in a modular way. The drivers may be implemented using high level coding languages because of the calling conventions and environment provided by the EFI. This in turn may help to reduce the difficulty and cost of innovation. The option of the Interface Partition 16 shown in FIG. 1 (which is a segment of a partition of, for example, a hard disk drive), provides an alternative to non-volatile memory storage for such extensions.

Figure 2:
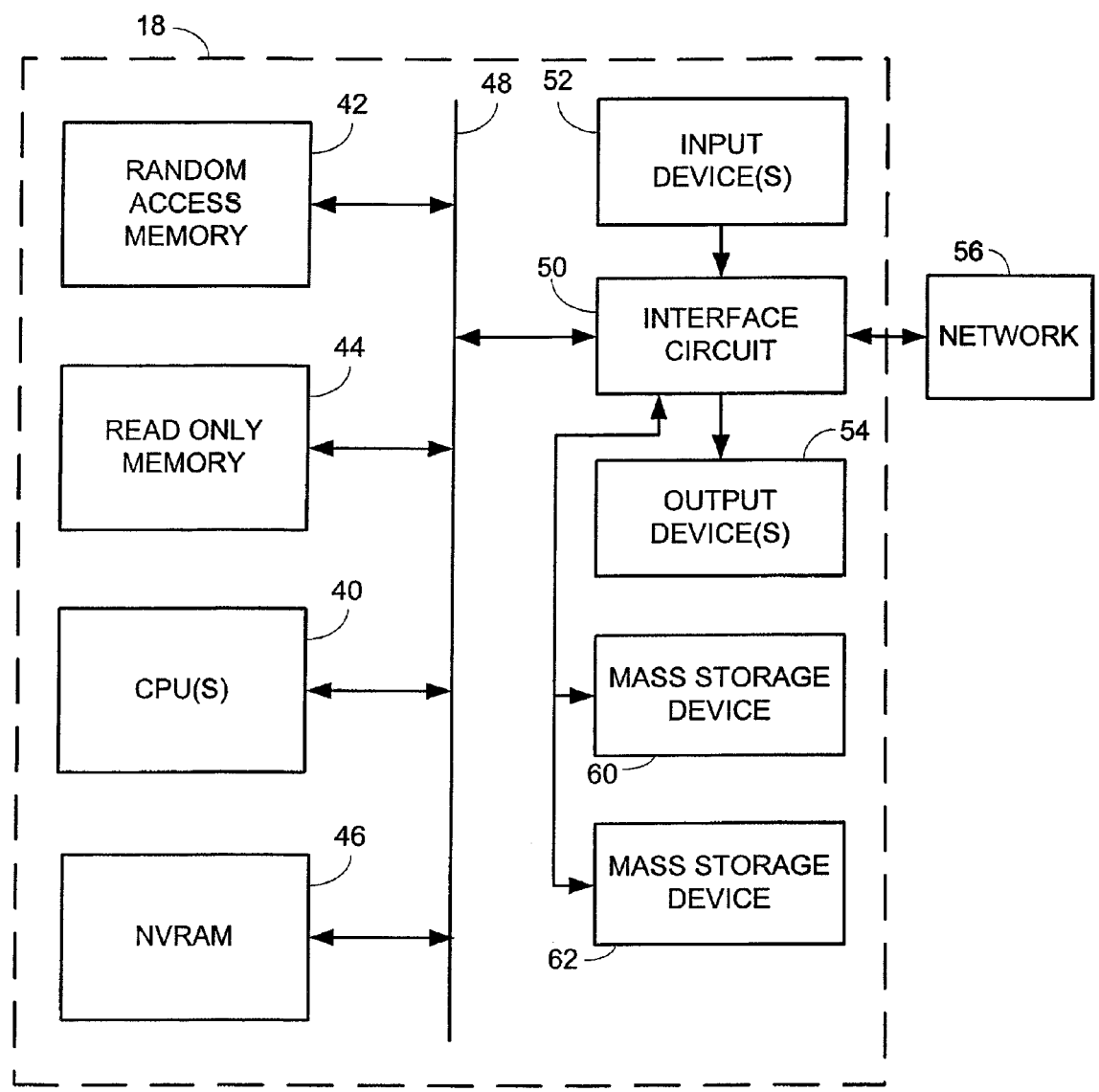
FIG. 2 is a block diagram of an exemplary computer utilizing the components of FIG. 1.

Referring to FIG. 2, as is conventional, the central processing unit 40 of the computer 18 is in communication with a number of machine-accessible medium including a volatile memory 42, a non-volatile memory 44, and a non-volatile random access memory (NVRAM) 46 via a bus 48. SDRAM, DRAM, RAMBUS or any other type of Random Access Memory (RAM) device may implement the volatile memory 42. Flash memory, option-ROMs, or any other desired type of memory device may implement the non-volatile memory 44. Access to the memory 42 is typically controlled by a memory controller (not shown) in a conventional manner.

The computer 18 also includes a conventional interface circuit 50. The interface circuit 50 may be implemented by any type of well known interface standard, such as an Ethernet interface, a universal serial bus (USB) and/or a third generation input/output (3GIO) interface (also known as PCI Express).

One or more input devices 52 generically referred to herein as hardware devices, are connected to the interface circuit 50. The input device(s) 52 permit a user to enter data and commands into the CPU 40. The input device(s) 52 can be implemented by, for example, a keyboard, a mouse, a touch screen, a track-pad, a trackball, isopoint and/or a voice recognition system.

One or more output devices 54, also generically referred to herein as hardware devices, are also connected to the interface circuit 50. The output devices 54 can be implemented, for example, by display devices, a printer and/or speakers. The interface circuit 50 would, thus, typically include a graphics driver card.

The interface circuit 50 may also include a communication device such as a modem or network interface card to facilitate exchange of data with external computers via a network 56 (e.g., an Ethernet connection, a digital subscriber line (DSL), a telephone line, coaxial cable, a cellular telephone system, etc.). Typically, the computer 18 also includes one or more mass storage devices 60 for storing software and data. Examples of such mass storage devices include floppy disk drives, hard drive disks, compact disk drives and DVD drives, all of which may be generically referred to as "disks".

Figure 3:
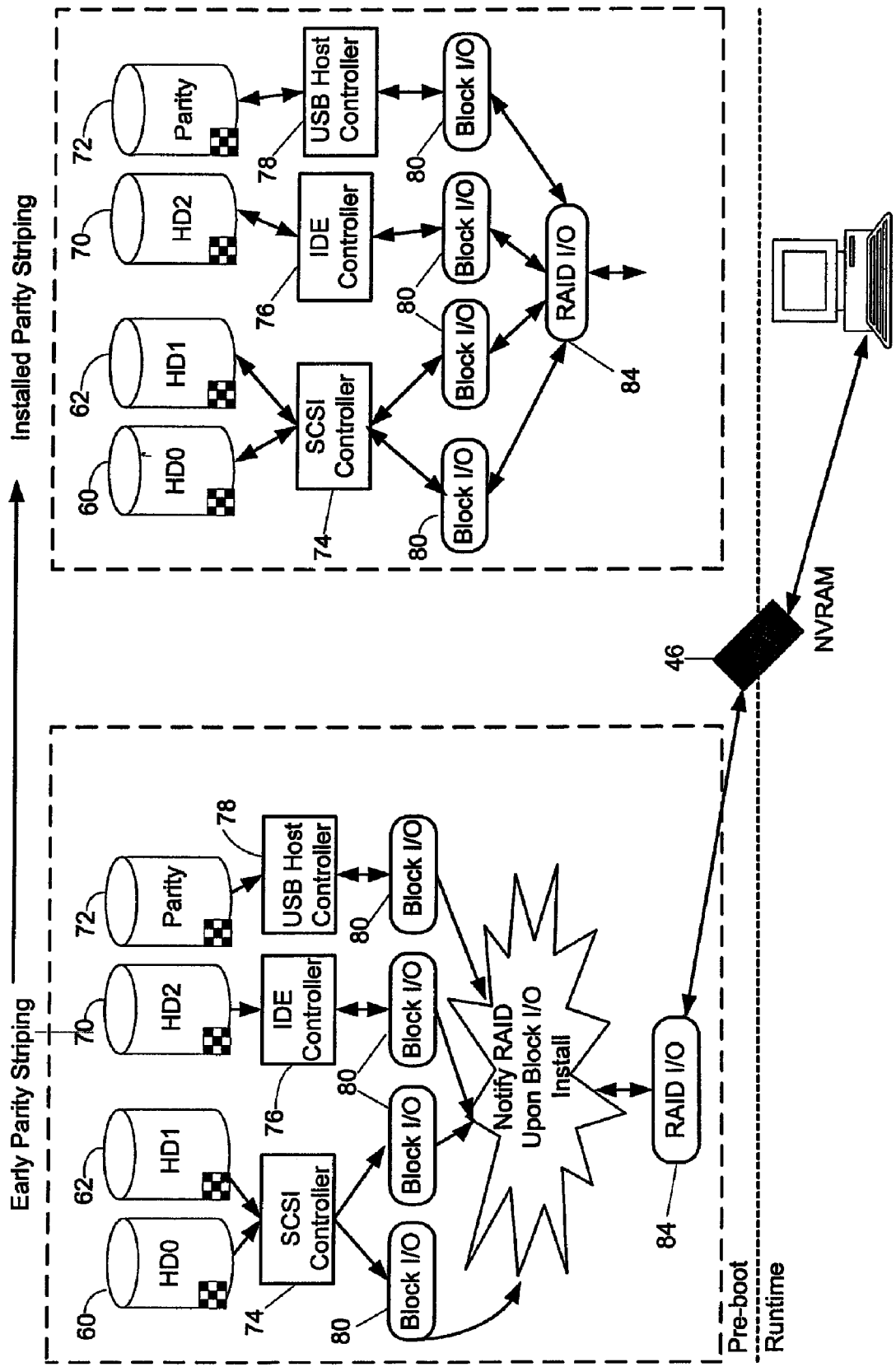
FIG. 3 is a block diagram of an embodiment of a system having a plurality of disks connected to provide early and late software RAID.

A plurality of disks, such as the disks 60 and 62 shown in FIG. 2, as well as disks 70 and 72, may be linked together to form a RAID configuration as shown in FIG. 3. Those persons of ordinary skill in the art will appreciate that commonly used RAID configurations include 0, 1, and 5. RAID 0 is "striping" (i.e., interleaving LBA of several disks to a single disk interface in order to provide better performance). RAID 1 is referred to as "mirroring," which provides the ability for each disk in the RAID set to have an alternate disk so that if one fails, its alternate can still serve the data. RAID 5 is referred to as "parity striping," where a plurality of disks "N+1 disks" are provided where the final disk is an XOR of the parity for a given strip on the antecedent in N disk. A strip is some collection of sectors greater than or equal to 1. In order to provide both early and late RAID, there is a parent-child relationship wherein the parent is the RAID driver that maps a set of N Block I/O virtual interfaces to a set of M actual Block I/O interfaces, with N necessarily less than M. Block devices and Block I/O interfaces will be described in more detail below.

Referring to FIG. 3, RAID 5 is shown as both early parity striping in a pre-boot environment as well as installed parity striping in an OS runtime environment. As previously mentioned, a plurality of disks 60, 62, 70, and 72 are included in the system and coupled to the host processor 40. These disks can be attached through sundry buses, including parallel and serial ATA, USB, and SCSI. Disks 60 and 62 are coupled to the SCSI controller 74, disk 70 is coupled to the IDE controller 76, and disk 72 is the parity disk and is coupled to USB host controller 78. Each controller 74, 76, 78 may have several disk they control. Each disk 60, 62, 70, and 72 will have a physical access abstraction published by its respective driver. The physical access abstraction is referred to as a Block I/O interface 80 or as a Block I/O protocol, and provides read, write, reset, and mode information.

Upon the creation of a Block or of the Block I/O interfaces 80, a notification event will alert a RAID I/O driver 84. After being alerted, the RAID I/O driver 84 will query a RAID configuration database which is stored in the NVRAM 46, or any other fault-tolerant repository. The NVRAM data can consist of Internal Form Representation (IFR) so that there is a pre-defined mechanism to access information and a configuration interface for the RAID both in the pre-boot and in the runtime environments.

Once the RAID I/O 84 has determined that a particular block device in question belongs to the RAID set, the RAID I/O 84 can deprecate the Block I/O to a private communication channel so that there are no avenues for external resources to inappropriately communicate with the drives. The RAID configuration stored in the NVRAM 46 includes IFR encoding so that there is a pre-defined mechanism to access the configuration interface data for the RAID both in the pre-boot and the runtime environment. Although the RAID configuration illustrated in FIG. 3 includes four disks utilizing RAID 5, it should be understood that different numbers of disks and different RAID configurations may be utilized.

Figure 4:
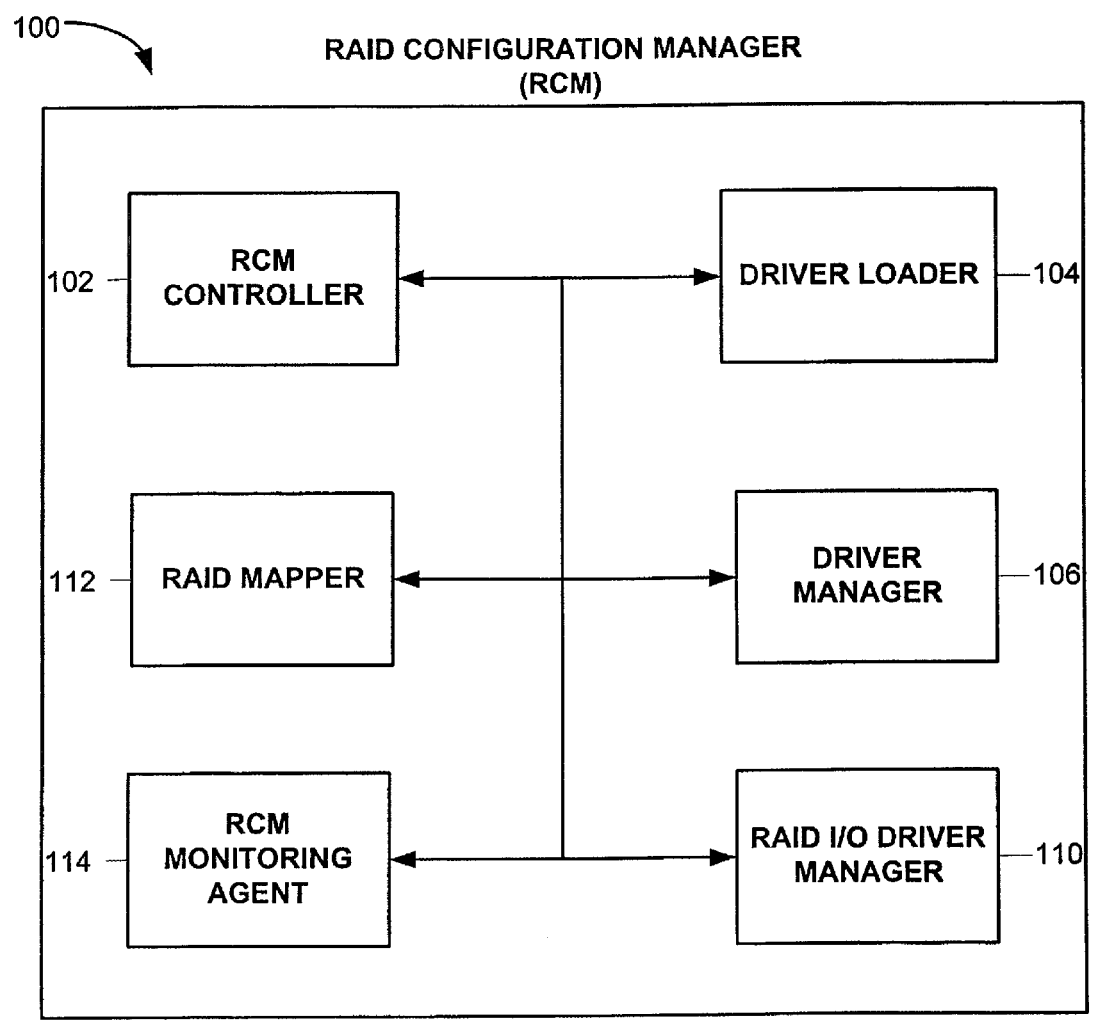
FIG. 4 is a schematic illustration showing an embodiment of a firmware interface RAID configuration manager constructed in accordance with the teachings of the patent.

FIG. 4 illustrates schematically an embodiment of a RAID Configuration Manager (RCM) 100 to provide software RAID in a pre-boot environment and continue seamlessly into an OS runtime environment. The RCM 100 provides the ability to offer both early and late software RAID and includes a RAID Configuration Manager controller 102 to provide the QS 30 with a content of a virtual disk interface to enable a commensurate software RAID to be utilized after the OS 30 is loaded. The RCM controller 102 is in communication with a driver loader 104 to load one or more drivers to abstract a plurality of disk interfaces for a plurality of disks, such as disks 60, 62, 70, 72, coupled to the processor 40, before the OS 30 is loaded on the computer 18.

The RCM controller 102 is also in communication with a driver manager 106 to initiate a query across one or more buses to locate one or more available disks attached to the buses, and to aggregate a set of data corresponding to the plurality of disks and to publish on a handle a physical access abstraction interface (Block I/O protocol) for each disk as well as a device path protocol (location) for each disk in the plurality of disks. The Block I/O protocol provides read, write, reset, and mode information.

Also included in the RAID Configuration Manager 100 is a RAID I/O driver manager 110 that is in communication with the RCM controller 102 to alert a RAID I/O driver on the publication of every Block I/O. The RAID I/O driver manager 110 in conjunction with the RCM controller 102 query the RAID configuration database for one or more global firmware variables (GUIDs) that are stored in the NVRAM 46. The GUID retrieved by the RAID I/O driver manager 110 corresponds to a specific RAID technique that is to be utilized on the computer 18. The RAID I/O driver manager 110 also obtains a device path from the Block I/O on a handle for all disks in the RAID set and locates all handles with Block I/O.

A RAID mapper 112 is also in communication with the RCM controller 102 to map the plurality of disks according to the specific RAID technique identified in the GUID, before the OS 30 is loaded. The RAID configuration manager 100 also includes an RCM monitoring agent 114 which is in communication with the RCM controller 102 to monitor the computer 18 for a request to access the disk from both the firmware interface 10 and the OS 30. Access to the disk includes requests to read data from the disk, write data to the disk, and manipulate data currently on the disk. In other words, the RCM monitoring agent 114 in conjunction with the RCM controller 102 operate to monitor the computer 118 for multiple types of access requests in both the pre-boot environment as well as in the OS runtime environment.

It should be noted that the RAID configuration manager 100 and all the components therein are capable of functioning in a pre-boot environment before the OS 30 is fully loaded and seamlessly continue to function with the concurrently running OS 30.

The RCM monitoring agent 114 also monitors the computer 18 for a request from an OS loader for virtual Block I/O data. If the RCM monitoring agent 114 does not detect a request for virtual Block I/O data from the OS loader, the RCM monitoring agent 114 will monitor the computer 18 for access to the disk and more specifically to the FISP 16. If a read, write, or reset command is detected by the RCM monitoring agent 114, the RCM controller 102 is used to perform a read, write, or reset operation using the appropriate RAID technique designated in the virtual Block I/O. Thereafter, the firmware interface 10 will continue launching the OS 30.

If the RCM monitoring agent 114 detects a request for virtual Block I/O data from the OS loader, the RCM controller 102 passes the GUID to an OS loader I/O manager or other firmware interface agent that parses the device path of the virtual Block I/O to determine the appropriate RAID technique to utilize in the OS runtime environment. After the OS 30 finishes booting and assumes control of the computer 18, the OS 30 provides commensurate software RAID that matches the RAID configuration designated in the virtual Block I/O that was utilized by the firmware interface 10 in the pre-boot environment.

An embodiment of a software program for implementing the RAID configuration manager 100 of FIG. 4 is shown in FIGS. 5A-C. In this embodiment, the program is for execution by the processor 40 and is embodied in software stored on a machine-accessible medium such as a CD-ROM, a floppy disk, a hard drive, a DVD, or a memory associated with the processor 40, but persons of ordinary skill in the art will readily appreciate that parts of the program could alternatively be executed by a device other than the processor 40 and/or embodied in the firmware 12 or dedicated hardware in a well known manner.

For example, any of the RCM controller 102, the driver loader 104, the driver manager 106, the RAID I/O driver manager 110, the RAID mapper 112, and/or the RCM monitoring agent 114 could be implemented by software, hardware, and/or firmware. Further, although the example program is described with reference to the flowcharts illustrated in FIGS. 5A-C, persons of ordinary skill in the art will readily appreciate that many other methods of implementing the RAID configuration manager 100 of FIG. 4 may alternatively be used. For example, the order of many of the blocks may be changed, and/or some of the blocks described may be changed, eliminated, or combined.

Referring to FIG. 5A, the flowchart 200 illustrates a program to provide seamless software RAID in the computer 18 on the host processor 40. After a system reset (block 202) where the computer 18 is reset or turned on for the first time, a chipset and memory initialization is performed. This includes initializing a main memory, performing a PCI bus enumeration, and performing a resource allocation (block 204). Thereafter, an I/O Controller Hub (ICH) is initialized (block 206) and the firmware interface 10 is launched (block 210). The firmware interface 10 may be the Extensible Firmware Interface and is launched with the use of a host processor 40 prior to loading the OS 30. Along with launching the firmware interface 10, the Raid Configuration Manager 100 from FIG. 4 is also launched to provide the early RAID in the pre-boot environment.

After activating the RAID configuration manager 100, the RCM controller 102 and the driver loader 104 load one or more drivers to abstract interfaces for a plurality of disks (IDE Channel) (block 212). The driver(s) initiate a query across a bus to identify a plurality of available disks coupled to the host processor 40 (block 214). The RCM controller 102 and the driver manager 106 work in conjunction to aggregate the responses from a plurality of responses for the available drives (block 216) and publish on a handle a physical access abstraction interface (Block I/O Protocol) for each disk (block 220).

As shown in FIG. 5B, the Block I/O Protocol provides read, write, reset, and mode information (block 222). The RCM controller 102 and the driver manager 106 also publish on the handle a device path protocol for each disk (block 224). In other words, a physical location for each disk is published on the handle. If there is a RAID I/O driver on the platform, the driver manager 106 alerts the RAID I/O driver on the publication of every Block I/O instance (block 226). Upon receipt of Block I/O instances, the RAID I/O driver manager 110 in conjunction with the RCM controller 102 queries a RAID configuration database for global firmware variables (GUIDs) stored in the NVRAM 46 (block 230). Those of ordinary skill in the art will appreciate that another variable of a well-known name may also be utilized if there is a requirement to manage the variable during the OS runtime, or some other art such as an IFR-managed configuration.

If appropriate variables were not found (block 232), the RAID I/O driver manager 110 will communicate this occurrence to the RCM controller 102 which will ignore the publication of Block I/Os and continue loading the OS 30 (block 234). If one or more variables is found at the block 232, the RAID I/O driver manager 110 and the RCM controller 102 will obtain a device path from the Block I/O on a handle for all of the disks in the RAID set (block 240) and locate all handles with Block I/O (block 242). After locating all handles with Block I/O, the RAID mapper 112 performs a mapping of the plurality of disks according to the specific RAID technique identified in the global variable (block 244).

As shown in FIG. 5C, the RAID I/O driver manager 110 and the RCM controller 102 publish a virtual I/O on a new handle that includes the device paths for the plurality of disks and the RAID technique (block 246). In other words, a virtual disk interface for the plurality of disks is published on the new handle. The RCM controller 102 then sets the mode for the virtual Block I/O to the composite size of the RAID set (block 250) and un-installs the initial Block I/O for the plurality of disks in the RAID set (block 252).

For example, if the global variable details mirroring, which can include Odd-Driver Mirroring (ODM), the firmware interface RAID Protocol marshals the interfaces to the respective Block I/O instances that will provide the interfaces for the mirror-set, un-install the interfaces, and install a new Block I/O Protocol. The new Block I/O Protocol shall assume the physical device path information of the managed Block I/O instances, and wrap them in a RAID_Descriptor device path mode. This mode shall describe a managed instance number, a managed instance device path, a RAID level, and a strip size. The mode information for this virtual Block I/O is the composite size of the RAID set. If the mirroring technique is utilized for two disks having one GB of memory capability, the mode information will be one GB with a device path that includes the two disk locations and the RAID type will equal mirroring. In other words, the descriptor may be thought of as a virtual device path that subsumes strictly greater than one physical device path.

For RAID level 5, the parity calculation shall be a simple XOR. For RAID level 0, the policy shall be simple mirroring. For RAID level 1, the policy shall be striping and mirroring. There shall be a descriptor entry which details the drive that will be used as the parity disk. In addition, if a hot spare is to be provided, this device will have the appropriate annotation in the descriptor.

A system administrator, or some autonomous system configuration program, whether it is in the pre-boot or OS runtime environment, shall have the ability to manage the RAID sets. An exemplary implementation can be via a user interface that abstracts the RAID configuration variable or some other IFR-driven callback into the firmware interface RAID protocol driver.

Still referring to FIG. 5C, the RCM monitoring agent 114 monitors the computer 18 for a request from an OS loader for a set of data corresponding to a virtual disk interface (Block I/O data) (block 254). If it is determined at the block 256 that a request for the virtual disk interface is not detected by the RCM monitoring agent 114, the RCM monitoring agent 114 will monitor the computer 18 for an access request to the disks in the RAID set (block 270). For example, the RCM monitoring agent 114 will monitor the computer 18 for a read, a write, or a reset command to two or more of the disks in the RAID set (block 270).

If it is determined at the block 272 that a read, a write, or a reset command was not issued, the RAID configuration manager will continue launching the OS 30 (block 276). If it is determined at the block 272 that a read, a write, or a reset command has been detected, the RAID configuration manager 100 running on the host processor 40 will perform corresponding read, write, or reset operations using the appropriate RAID technique designated in the virtual disk interface (block 274). For example, if a read command is detected at the block 272, the RAID configuration manager 100 will cause the OS processor 40 to perform a read operation from two or more of a plurality of disks in the RAID set using a specific RAID technique designated in the virtual disk interface.

If it is determined at the block 256 that the RCM monitoring agent 114 has detected a request for the virtual disk interface, an OS loader I/O Manager or another firmware interface agent parses a device path of the virtual disk interface (block 260). The OS loader I/O Manager, upon parsing the device path of the virtual disk interface, shall discover that there was a software RAID set in use in the pre-boot environment. As such, the OS 30 will finish booting and assume control of the computer 18 (block 262). Thereafter, the OS 30 will provide a commensurate software RAID driver that matches the RAID configuration identified in the virtual disk interface (block 264). This will allow for seamless software RAID from the pre-boot environment to the OS runtime environment. It is through the architectural contract of the device path that the state information is conveyed.

The firmware interface-to-OS seamless, software RAID described in the program 200 provides for a mirrored boot disk and common RAID support pre-boot and runtime agents, including some fault tolerance on the Firmware Interface System Partition (FISP). As discussed above, the FISP is the FAT partition where the OS loaders and other diagnostics are installed by the sundry IHVS, OEMs, and OSVs. Furthermore, the program 200 enables two disparate operational environments, namely the pre-boot and one of several possible operating system runtimes, to share standard host-bus adaptor interfaces to block devices for the purpose of a single view of a RAID set.

By incorporating the RAID metadata in a standards-based namespace referred to as the device path, the RAID set aggregation of disks can be supported by various software implementations of RAID. Those persons of ordinary skill in the art will also appreciate that this seamless software RAID technique can be extended for device paths that provide Block I/O abstractions across to other channels or media, including but not limited to flash devices, network attached stores, RAM disks, etc.

Figure 6:
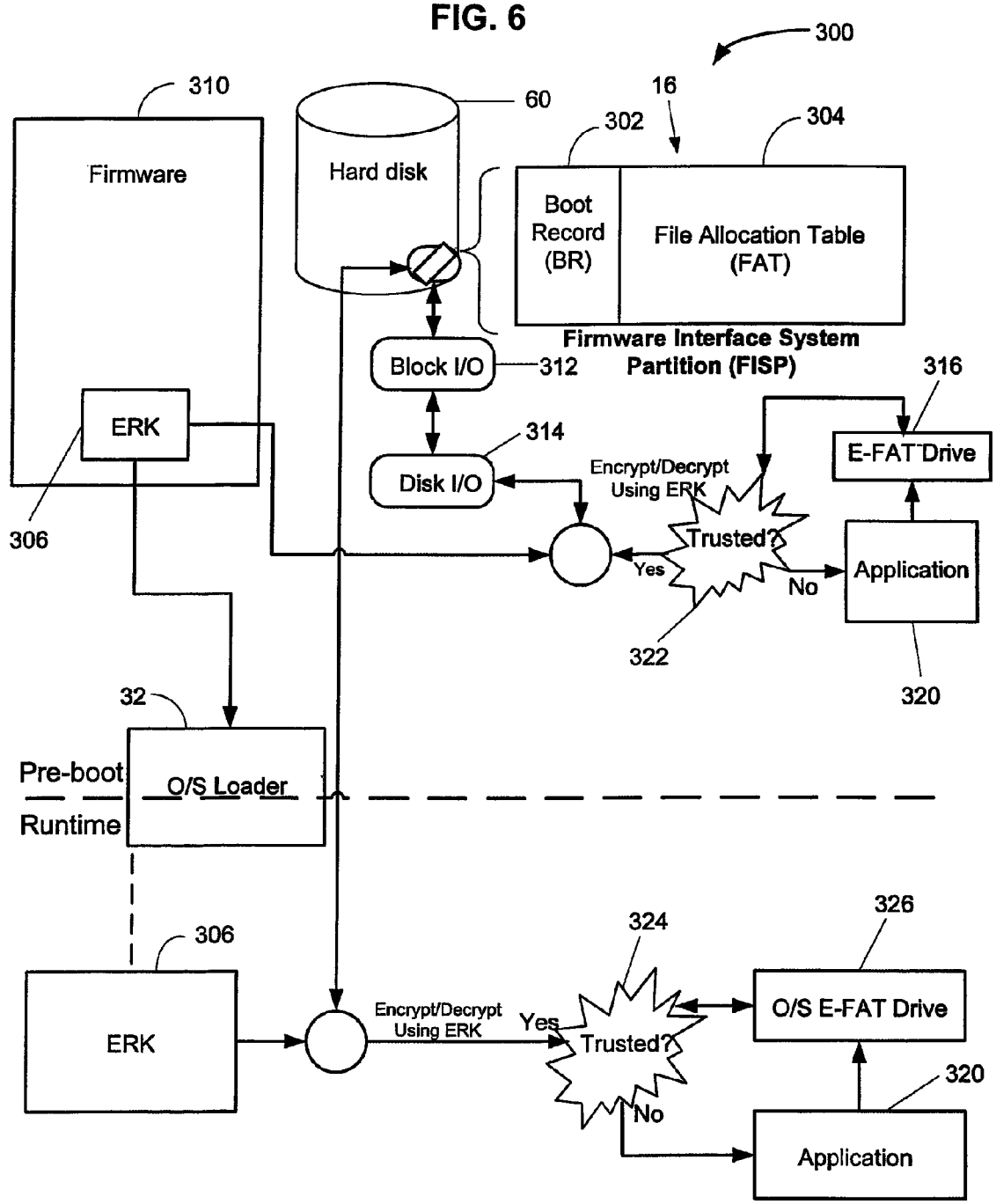
FIG. 6 is a block diagram of an embodiment of a system to provide encryption of a firmware interface system partition in the pre-boot and OS runtime environments.

FIG. 6 is a block diagram of an embodiment of a system 300 to provide encryption of the Firmware Interface System Partition (FISP) 16 in the pre-boot and OS runtime environments. The system 300 is not a fully encrypted file system, but provides encryption against the FISP 16. An example of an FISP is an EFI system partition (ESP). The system 300 provides symmetric encryption of the file system metadata, including the boot record 302, MBR, GPT, and a File Allocation Table (FAT) 304. In order to provide the secure and encrypted FISP 16, the platform utilizes a unique secret that is referred to as an Embedded Route Key (ERK) 306. The ERK 306 is encapsulated in the firmware 310 through commensurate art to ensure its integrity and opaqueness from third parties. The firmware 310 and other devices developed by independent hardware vendors will publish Block I/O interfaces via their drivers. These interfaces abstract sector/granular read, write, reset, and mode information for their given block device. The interfaces can be deployed across heterogeneous buses and technologies, such as SCSI, ATA, USB, etc. These interfaces are stateless and have no security or cryptographic attributes.

After initialization, the firmware interface 10 will discover block devices which contact FISPs and publish the corresponding standard interfaces of Block I/O 312 and Disk I/O 314. If the determination is made that an associated FISP 16 on the disk 60 has been encrypted, an encoded compatible FAT driver 316 (E-FAT) (block 312) will layer on top of a disk I/O accessor to proxy simple file system calls to the FISP 16 from an application 320.

When a read, write, or reset command is issued to the FISP 16, a determination of trust is made at the block 322. If there is not trust, the access request to the disk 60 near the FISP 16 is returned to the caller. If the request is trusted, the ERK 306 is used to assist a read/write operation. Once trust has been determined, the ERK 306 will be used to encrypt/decrypt the data.

To provide runtime compatibility, the OS 30 will need to be aware of the ERK 306. If the OS loader 32 has been deemed trusted by any variety of policy settings, the ERK 306 is passed from the firmware interface 10 to the OS loader 32 so that during runtime operation, the native file system driver will be able to traverse, parse, and update the FISP 16.

In the runtime environment, similar to the pre-boot environment, a determination can be made at the block 324 that the FISP 16 is encrypted and that the ERK 306 was passed through the OS loader 32 to enable read/write operations. Once trust is determined, a native OS E-FAT driver 326 is installed to handle the operations in the OS runtime environment. After the OS 30 is loaded, a trust determination is made for all read/write accesses to the FISP 16. For accesses received form a trusted source, the use of the ERK 306 is mandated for encryption/decryption. The passing of the ERK 306 from the firmware interface 10 to the OS loader 32 enables pre-boot encryption that the OS runtime "inherits." This ERK hand-off could be a literal conveyance of the ERK binary on the stack, or the use of some cryptographic co-processor capabilities (i.e., seal against common PCR). In other words, the firmware 310 makes a trust decision to convey the information and/or capability to the OS 30 and the OS 30 maintains the trust relationship by performing commensurate cryptographic manipulations to the FISP 16.

Figure 7:
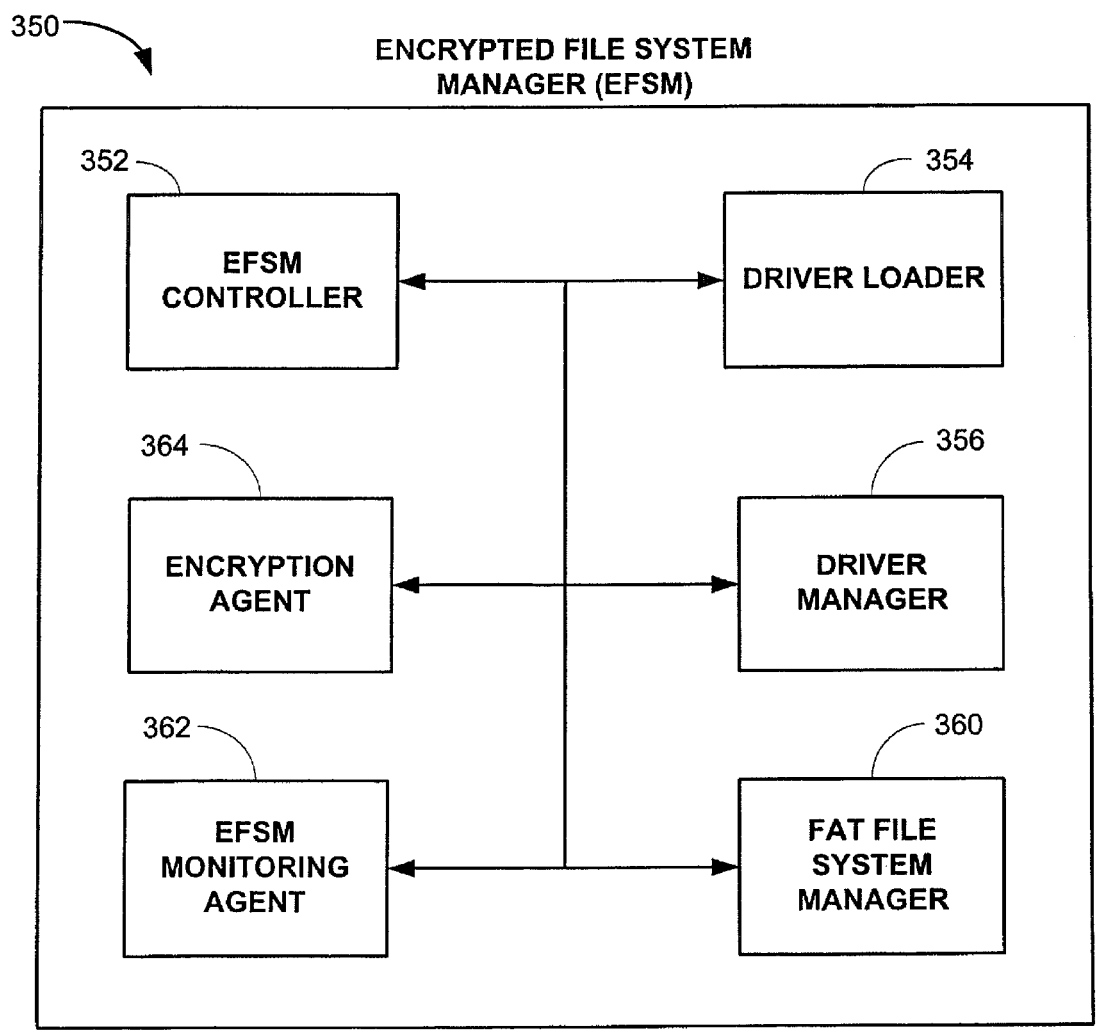
FIG. 7 is a schematic illustration showing an embodiment of a firmware interface encrypted file system manager constructed in accordance with the teachings of the patent.

FIG. 7 illustrates schematically an embodiment of a firmware interface Encrypted File System Manager (EFSM) 350 constructed in accordance with the teachings of the present patent. The EFSM 350 provides the ability to provide seamless encryption of a firmware interface system partition that includes an EFSM controller 352 that communicates with a driver loader 354 to load a driver to abstract an interface for a disk that is coupled to the computer 18, before the OS 30 is loaded. The EFSM 350 also includes a driver manager 356 that is in communication with EFSM controller 352 to initiate a query across a bus for available attached disks and aggregate responses from the available disks. The driver manager 356 identifies the disks within the FISP 16 and publishes on a handle a physical access abstraction interface (Block I/O Protocol) and a device path protocol for each disk. The Block I/O Protocol provides read, write, reset, and mode information.

A File Allocation Table (FAT) file system manager 360 is also included. The FAT file system manager 360 is in communication with the EFSM controller 352 to layer or identify if any FISPs are encrypted and to layer an encoded FAT on top of the disk(s), before the OS 30 is loaded on the computer 18.

The EFSM 350 also includes an EFSM monitoring agent 362 that is in communication with the EFSM controller 352 to monitor the computer 18 for a request from the OS 30 for virtual Block I/O data. The EFSM monitoring agent 362 also monitors the computer 18 for an access request to the FISP in both the pre-boot environment and the OS runtime environment. In other words, the EFSM monitoring agent 362 monitors the computer 18 for a read or a write command to the FISP 16. The EFSM controller 352 passes to the OS 30 ERK 306 to provide access to an encrypted FISP after the OS 30 is loaded on the computer 30. The EFSM 350 further includes an encryption agent 364 that is in communication with the EFSM controller 352 to utilize the ERK 306 to encrypt and/or decrypt data written to the FISP 16 and decrypt data read from the FISP. The encryption agent 364 also uses the ERK 306 to update the FAT 304 any time a file is created or deleted.

Figure 8A:
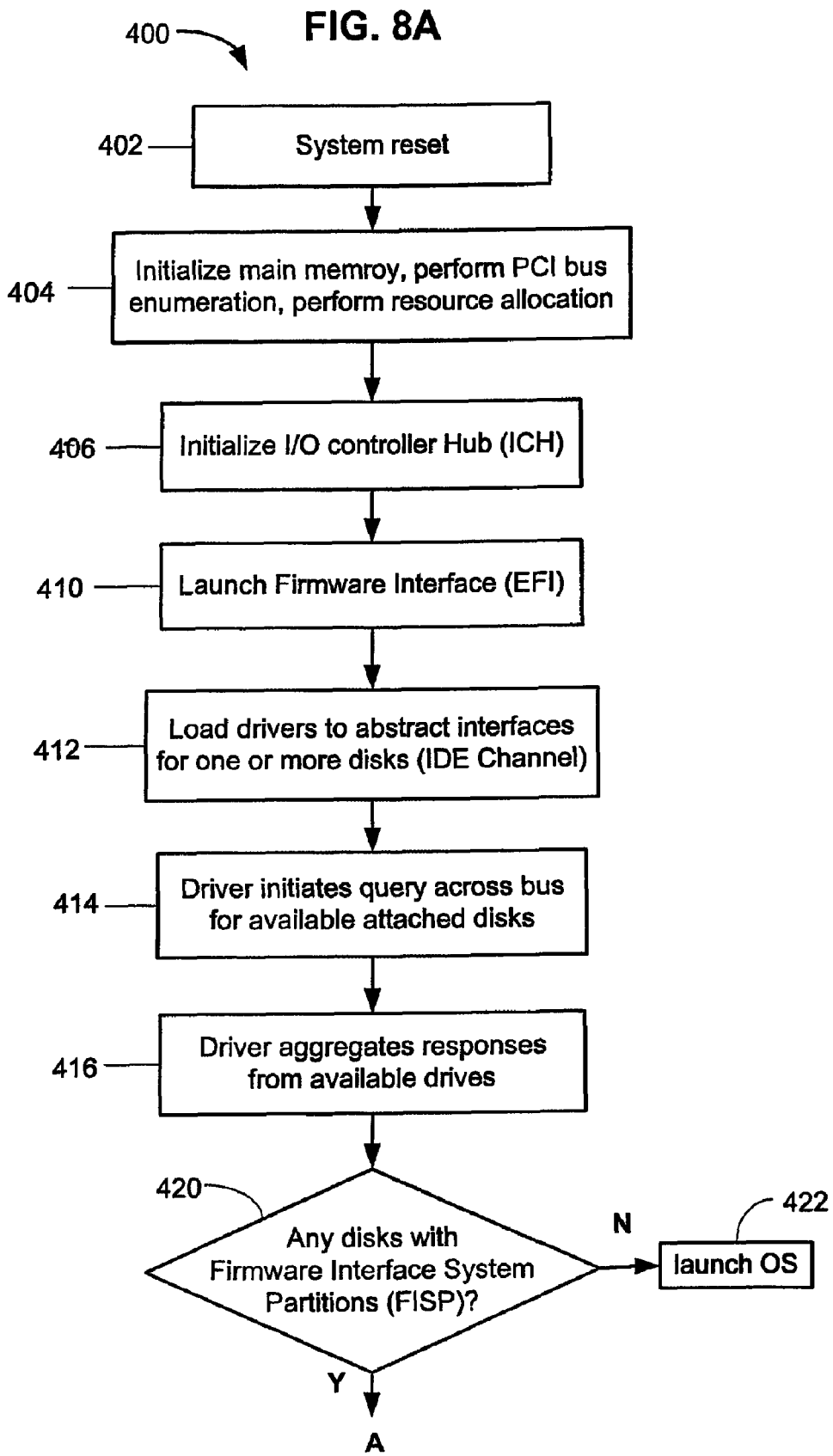
Figure 8C:
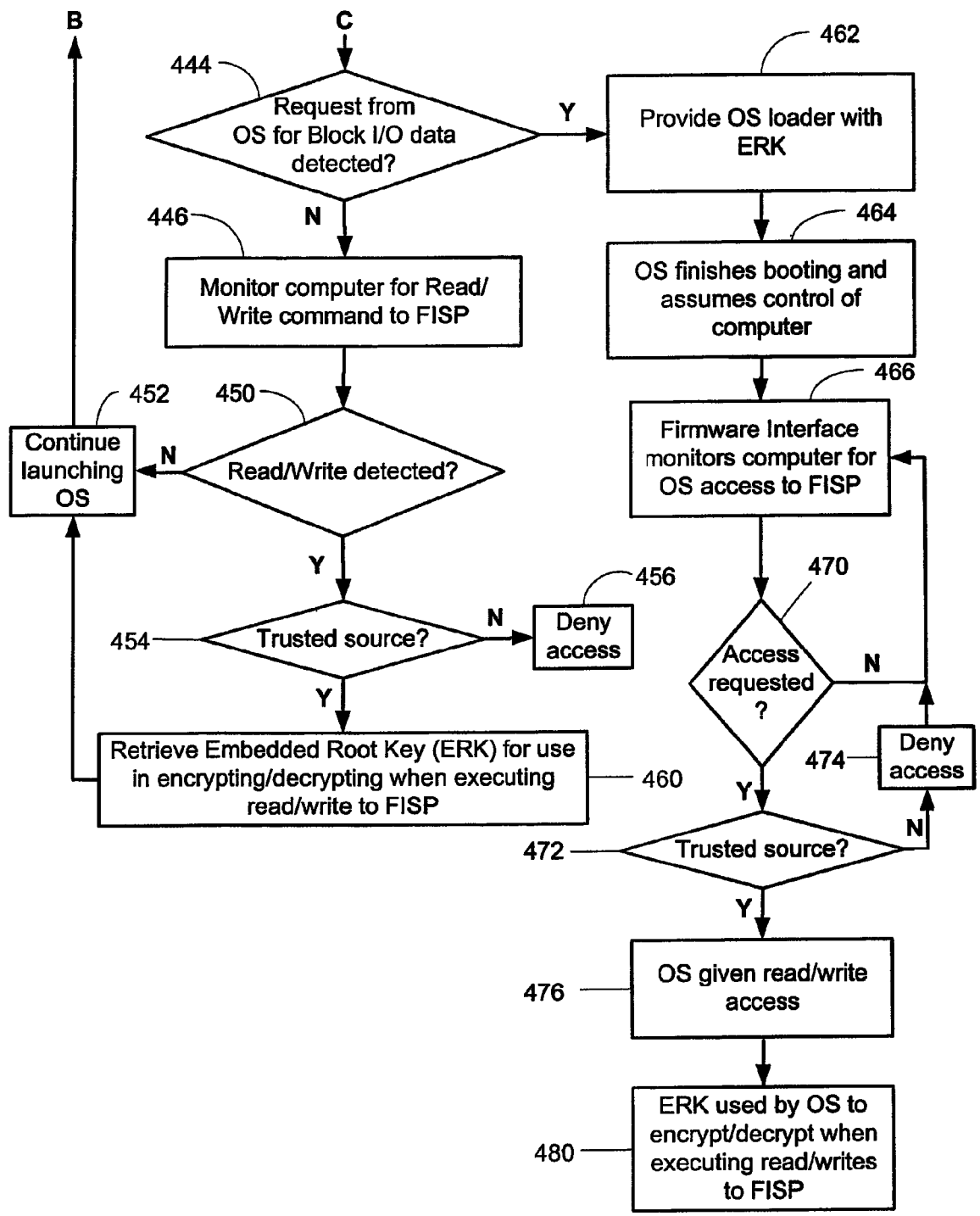

An embodiment of a software program for implementing the encrypted file system manager 350 of FIG. 7 is shown in FIGS. 8A-C. In this embodiment, the program for execution by the processor 40 it is embodied in software stored on a machine-accessible medium such as a CD-ROM, floppy disk, hard drive, a DVD, or a memory associated with the processor 40, or persons of ordinary skill in the art will readily appreciate that the entire program apart thereof could alternatively be executed by a device other than the processor 40 and/or embodied in the firmware 12 or dedicated hardware in a well-known manner.

For example, any or all of the EFSM controller 352, the driver loader 354, the driver manager 356, the FAT file system manager 360, the EFSM monitoring agent 362, and/or the encryption agent 364 could be implemented by software, hardware, and/or firmware. Further, although the example program is described with reference to the flowcharts illustrated in FIG. 8A-C, persons of ordinary skill in the art will readily appreciate that many other methods of implementing the encrypted file system manager 350 of FIG. 7 may alternatively be used. For example, the order of many of the blocks may be changed, and/or some of the blocks described may be changed, eliminated, or combined.

Referring to FIG. 8A, the flowchart 400 illustrates a program to seamlessly provide an encrypted file system in a pre-boot environment through an OS runtime environment for the computer 18. After a system reset (block 402) where the computer 18 has been reset or turned on for the first time, a chip set memory initialization is performed (block 404). This initialization includes initializing a main memory, performing PCI bus enumeration, and performing a resource allocation. The program next initializes an I/O Controller Hub (ICH) (block 406). Once the initial chip set and memory initialization has been performed, the computer's firmware interface 10, such as EFI for example is launched (block 410). Launching the firmware interface 10 includes launching the encrypted file system manager 350 from FIG. 7 to enable encryption and decryption of the firmware interface system partition 16 in both the pre-boot and OS runtime environments. Thereafter, the driver loader 354 loads a driver to abstract interfaces for one or more disks coupled to the processor 40 (block 412). The driver manager 356 then initiates a query across a bus for the available attached disks (block 414) and aggregates the responses from those available disks (block 416). The EFSM controller 352 and the driver manager 356 will then determine if any of the available disks include a Firmware Interface System Partition (FISP) (block 420).

In FIG. 8B, the EFSM controller 352 and the driver manager 356 will then publish on a handle a physical access abstraction interface (Block I/O protocol) for each disk having an FISP that is coupled to the computer 18 (block 424). The Block I/O Protocol provides read, write, reset, and mode information (block 426). The EFSM controller 352 and the driver manager 356 also published on the handle a device path protocol (location) for each of the disks having an FISP (block 430). The encryption agent 364 and the EFSM controller 352 will then determine if any of the FISPs are encrypted (block 432). If it is determined at the block 432 that no FISPs are encrypted, the OS 30 will continue launching (block 434).

If it is determined at the block 432 that encrypted FISP exits, the FAT file system manager 360 will layer an encoded FAT (E-FAT) driver 316 on top of the disk (block 436). It should be noted that there shall be a single disk I/O instance per Block I/O. The disk I/O provides byte-granular disk read/write access. The E-FAT driver 316 is the conduit through which access to the FISP 16 occurs.

In the event that no encrypted FISPs exist, and depending upon the platform policy, it may be a requirement to alternately partition and format the FISP in the pre-boot environment. Thus, the initial scribing of the disk is performed before the OS 30 is loaded. The initial scribing has the boot record 302 encrypted by the ERK 306. The boot record 302 thus has an associate message authentication code with it in an adjacent space. This is referred to as fingerprinting and allows the fixed-location information to reside in its compatibility locations.

For the FAT 304, however, because there are no compatibility issues as described with regard to the boot record 302, each FAT entry will be encrypted by the ERK 306 during format and also during the normal file system activation, which includes but is not limited to file creation, deletion, etc. Therefore, the platform has a capability to provide an encrypted file system and fingerprinted partitioning. This prohibits rogue or untrusted code from manipulating disk I/O interfaces directly and updating the file system without a subsequent access by a firmware file system driver detecting the anomaly. Worst, would be a denial-of-service by the rogue agent deleting the disk contents (block 442).

Still referring to FIG. 8B, after layering the E-FAT driver on top of the Disk I/O, the driver(s) publish on the handle a device path protocol (location) for each disk (block 440). The EFSM monitoring agent 362 and the EFSM controller 352 then monitor the computer 18 for a request from the OS loader 32 for a set of virtual Block I/O data.

As illustrated in FIG. 8C, if it is determined at a block 444 that there has not been a request from the OS loader 32 for Block I/O data, the EFSM monitoring agent 362 monitors the computer 18 for an access request to the FISP 16 in the form of a read/write command (block 446). If it is determined at the block 450 that the EFSM monitoring agent 362 has not detected a request to read or write to the FISP 16, the OS loader 32 will continue launching the OS 30 (block 452). If it is determined at the block 450 that a request to read or write to the FISP 16 has been detected, the EFSM controller 352 will determine if the request is from a trusted source (block 454). If the request is not from a trusted source, access is denied (block 456).

If it is determined at the block 454 that the request is from a trusted source, the EFSM controller 352 will retrieve the ERK 306 for use in encrypting/decrypting data when executing read/write commands to the FISP 16 (block 460). The ERK 306 may be located in a platform specific variable that is stored in the NVRAM 46 that is coupled to the processor 40. Thereafter, the OS loader 32 will continue launching the OS 30 (block 452). The firmware interface 10 is given the ability to use the ERK 306 to decrypt a set of data from the FISP 16 corresponding to a read request prior to loading the OS 30, as long as the read request is form a trusted source. Similarly, the firmware interface 10 may use the ERK 306 to encrypt a set of data that is written to FISP 16 that corresponds to a write request, if the write request is from a trusted source.

If it is determined at the block 444 that the OS loader 32 has requested the Block P/O data, the firmware interface 10 passes the ERK 306 to the OS loader 32, thus ensuring that the OS 30 has been provided with the ERK 306 that was used in the pre-boot environment (block 462). Thereafter, the OS loader 32 finishes booting the OS 30 and the OS 30 assumes control of the computer 18 (464).

The EFSM monitoring agent 362 continuous to monitor the computer 18 for access by the OS 30 to the FISP 16 (block 466). If it has been determined at a block 470 that access to the FISP 16 has not been requested, the EFSM monitoring agent 362 will continue to monitor the computer 18. If it is determined at the block 470 that access to the FISP 16 has been requested, the EFS controller 352 determines if the request is form a trusted source (block 472). If it is determined at the block 472 that the access request is not from a trust source, access will be denied (block 474) and the EFSM monitoring agent 362 will continue monitoring computer 18 for another access request.

If it is determined at the block 472 that the request is from a trusted source, the OS 30 is given read/write access to the FISP 16 (block 476). The OS 30 then uses the ERK 306 to encrypt/decrypt data when executing read/write operations to the FISP 16. For example, the OS 30 uses the ERK 306 to decrypt a set of data from the FISP 16 corresponding to a read request, if the read request is from a trusted source. Those of ordinary skill in the art will appreciate that access to the encrypted FAT may occur in the OS runtime without the occurrence of an access request in the pre-boot environment.

It should be noted that the encryptions are symmetric, and may use an algorithm such as 128-bit AES candidate Rijndael. The encrypted variant of FAT, referred to as E-FAT, is no longer the file system that the OS 30 can parse without the firmware secret. As such, there will be a trust decision made by the firmware when invoking the OS loader 32. This trust decision can be based upon other art, including having the OS loader 32 signed by the OEM who produced the motherboard, wherein only such signed loaders are trusted with the secret.

Alternatively, there could be a policy knob that decides to trust all applications in a "Windows" directory of the FISP 16. In either case it is under the purview of the firmware to make the trust decision. Upon making the trust decision, the firmware passes the ERK 306 to the OS loader 32 so that at OS runtime, when the OS 30 loads a native file system driver, it can use the ERK 306 to traverse, parse, and update the FISP 16.

Furthermore, an OS runtime partition and formatting tool would be required to use the ERK 306 in the same fashion as described above if the OS 30 were to reconstruct the FISP 16 for any reason. If such an ERK based file system creation were not employed, the firmware would have the ability to invoke a policy decision to refuse to execute content or create an FISP where the GPT/NBR have no fingerprint and the FAT is not encrypted. The program 400 thus allows for hardening the FISP 16 in both the pre-boot and runtime environments.

As described with relation to the foregoing example, the RAID configuration manager 100 and the encrypted file system manager 350 allow an OS and platform firmware (any software that is included in ROM) to communicate information necessary to support the OS boot process, thereby minimizing the investment of resources. The RAID configuration manager 100 and the encrypted file system manager 350 permit a standard shrink-wrap OS intended to run on a hardware platform to boot on a variety of system designs without additional platform or OS customization. This allows for platform innovation to introduce new features and functionality that enhance platform capability without requiring new code to be written in the OS boot sequence. In other words, the platform and OS are able to evolve and innovate independently of one another. Furthermore, the examples discussed above permit developers to design the interface so that it is compatible with a range of underlying hardware devices functions without having explicit knowledge of the specifics for each device in the range.

Although certain apparatus and methods implemented in accordance with the teachings of the patent have been described herein, the scope of coverage of this patent is not limited thereto. On the contrary, this patent covers all embodiments of the teachings of the invention fairly falling within the scope of the appended claims either literally or under the doctrine of equivalents.

What is claimed is:

1. A method of providing seamless file system encryption comprising:
    launching a firmware interface in a computer prior to loading an operating system (OS);
    publishing a physical access abstraction interface for a disk coupled to the computer, the disk having a Firmware Interface System Partition (FISP);
    determining if the FISP is encrypted and layering an encoded File Allocation Table (FAT) driver on top of the disk;
    if the FISP is encrypted, allowing the firmware interface to use an Embedded Root Key (ERK) to decrypt a set of data from the encrypted FISP corresponding to a first read request prior to loading the OS, if the first read request is from a trusted source;
    passing the ERK from the firmware interface to the OS; and
    allowing the OS to use the ERK to decrypt a second set of data from the encrypted FISP corresponding to a second read request, if the second read request is from a trusted source.

2. A method as defined in claim 1, comprising allowing the OS to use the ERK to decrypt the second set of data in response to the second read request without the occurrence of the first read request.

3. A method as defined in claim 1, further comprising retrieving a variable from a nonvolatile memory coupled to the computer to obtain the ERK.

4. A method as defined in claim 1, comprising identifying the disk by initiating a query across a bus coupled to the computer.

5. A method as defined in claim 1, further comprising monitoring the computer with the firmware interface for the second read request from the encrypted FISP by the OS.

6. A method as defined in claim 1, further comprising monitoring the computer with the firmware interface for an access request to write to the encrypted FISP by the OS; and
    allowing the OS to use the ERK to encrypt a third set of data that is written to the encrypted FISP corresponding to the access request, if the access request is from a trusted source.

7. A method of providing seamless file system encryption comprising:
    launching a firmware interface in a computer prior to loading an operating system (OS);
    publishing a physical access abstraction interface for a disk coupled to the computer; the disk having a Firmware Interface System Partition (FISP);
    determining if the FISP is encrypted and layering an encoded File Allocation Table (FAT) driver on top of the disk;
    retrieving a variable from a nonvolatile memory coupled to the computer to obtain an Embedded Root Key (ERK);
    allowing the firmware interface to use the ERK to decrypt a set of data from the FISP corresponding to a first read request prior to loading the OS, if the first read request is from a trusted source;
    passing the ERK from the firmware interface to the OS;
    monitoring the computer with the firmware interface for an access request to write to the FISP by the OS; and
    allowing the OS to use the ERK to encrypt a second set of data that is written to the FISP corresponding to the access request, if the access request is from a trusted source.

8. A method as defined in claim 7, comprising allowing the OS to use the ERK to encrypt the second set of data in response to the access request without the occurrence of the first read request.

9. A method as defined in claim 7, comprising identifying the disk by initiating a query across a bus coupled to the computer.

10. A method as defined in claim 7, further comprising monitoring the computer with the firmware interface for a second read request from the FISP by the OS.

11. A method as defined in claim 7, further comprising publishing a device path protocol for the disk.

12. A computer having a processor and an encrypted file system management apparatus, the encrypted file system management apparatus comprising:
    a controller to pass to an operating system an Embedded Root Key (ERK) to provide access to an encrypted Firmware Interface System Partition (FISP) after the operating system is loaded;

a driver loader in communication with the controller to load a driver to abstract an interface for a disk coupled to the processor, before the operating system is loaded on the computer;

a driver manager in communication with the controller to publish a physical access abstraction interface and a device path protocol for the disk, before the operating system is loaded;

a File Allocation Table (FAT) file system manager in communication with the controller to layer an encoded FAT on top of the disk, before the operating system is loaded on the computer;

an encryption agent in communication with the controller to use the ERK to encrypt data written to the FISP and to decrypt data read from the FISP; and a monitoring agent in communication with the controller to monitor the computer for an access request to the FISP, wherein the monitoring agent is accessed by a firmware interface and the operating system to use the ERK to write and/or read data from the FISP.

13. An apparatus as defined in claim 12 wherein the controller and the FAT file system manager retrieve a variable from a nonvolatile memory coupled to the processor to obtain the ERK.

14. An apparatus as defined in claim 12 wherein the controller and the encryption agent use the ERK to update the FAT when a file is created or deleted.

15. An article comprising a non-transitory machine-accessible storage medium having stored thereon instructions that, when executed by a machine, cause the machine to:

launch a firmware interface in the machine prior to loading an operating system (OS);

publish a physical access abstraction interface for a disk coupled to the machine, the disk having a Firmware Interface System Partition (FISP);

determine if the FISP is encrypted and publish a device path protocol for the disk if the disk is encrypted;

enable the firmware interface to use an Embedded Root Key (ERK) to decrypt a set of data from the FISP corresponding to a first read request prior to loading the OS, if the first read request is from a trusted source;

pass the ERK from the firmware interface to the OS; and enable the OS to use the ERK to decrypt a second set of data from the FISP corresponding to a second read request, if the second read request is from a trusted source.

16. The article of claim 15 having further instructions that, when executed by the machine, cause the machine to enable the OS to use the ERK decrypt the second set of data in response to the second read request without the occurrence of the first read request.

17. The article of claim 15 having further instructions that, when executed by the machine, cause the machine to retrieve a variable from a nonvolatile memory coupled to the machine to obtain the ERK.

18. The article of claim 15 having further instructions that, when executed by the machine, cause the machine to monitor the machine with the firmware interface for the second read request from the FISP by the OS.

19. The article of claim 15 having further instructions that, when executed by the machine, cause the machine to monitor the machine with the firmware interface for an access request to write to the FISP by the OS; and allow the OS to use the ERK to encrypt a third set of data that is written to the FISP corresponding to the access request, if the access request is from a trusted source.

* * * * *